(12) United States Patent
Tokunaga

(10) Patent No.: US 10,117,143 B2
(45) Date of Patent: Oct. 30, 2018

(54) COMMUNICATIONS PROCESSING SYSTEM, COMMUNICATIONS PROCESSING METHOD, COMMUNICATIONS CONTROL DEVICE, AND CONTROL METHOD AND CONTROL PROGRAM FOR THESE

(71) Applicant: NEC Corporation, Tokyo (JP)

(72) Inventor: Michita Tokunaga, Tokyo (JP)

(73) Assignee: NEC CORPORATION, Tokyo (JP)

(*) Notice: Subject to any disclaimer, the term of this patent is extended or adjusted under 35 U.S.C. 154(b) by 161 days.

(21) Appl. No.: 14/904,842

(22) PCT Filed: Jun. 30, 2014

(86) PCT No.: PCT/JP2014/067342
§ 371 (c)(1),
(2) Date: Jan. 13, 2016

(87) PCT Pub. No.: WO2015/015977
PCT Pub. Date: Feb. 5, 2015

(65) Prior Publication Data
US 2016/0165497 A1    Jun. 9, 2016

(30) Foreign Application Priority Data
Jul. 29, 2013    (JP) .................................. 2013-157131

(51) Int. Cl.
*H04W 36/00* (2009.01)
*H04W 36/30* (2009.01)
*H04W 76/30* (2018.01)

(52) U.S. Cl.
CPC ... *H04W 36/0094* (2013.01); *H04W 36/0055* (2013.01); *H04W 36/0072* (2013.01); *H04W 36/30* (2013.01); *H04W 76/30* (2018.02)

(58) Field of Classification Search
CPC ............. H04W 48/18; H04W 36/0022; H04W 36/0055; H04W 36/0061; H04W 36/0072;
(Continued)

(56) References Cited

U.S. PATENT DOCUMENTS 8,081,562 B2 * 12/2011 Charpentier .......... H04L 1/1671
                                                    370/216
9,155,014 B2    10/2015 Tenny et al.
(Continued)

FOREIGN PATENT DOCUMENTS

JP    2008-118640    5/2008
JP    2011-151610    8/2011
(Continued)

OTHER PUBLICATIONS

Extended European Search Report (EESR) dated Feb. 3, 2017; Application No. 14831369.5.
(Continued)

Primary Examiner — Matthew C Sams
(74) Attorney, Agent, or Firm — Young & Thompson

(57) ABSTRACT

A communications processing device that reduces the time after call disconnection until call reconnection, by using a message having a higher delivery probability than a handover instruction, when wireless quality could result in handover instruction failure. The communications processing device includes: a measurement report acquisition unit that obtains a measurement report relating to a communications environment from a mobile communications terminal located within the cell; a wireless quality determination unit that determines whether or not the quality of wireless communications with the mobile communications terminal, included in the measurement report, is lower than a threshold value; and a message transmission unit that, if the wireless quality is less than the threshold value, sends to the (Continued)

mobile communications terminal a message that has less data volume than a handover instruction message and includes the carrier frequency for the base station to be handed over.

7 Claims, 17 Drawing Sheets

(58) Field of Classification Search
CPC . H04W 36/0094; H04W 36/22; H04W 36/30; H04W 48/16; H04W 76/027; H04W 76/046; H04W 76/06; H04W 8/18
See application file for complete search history.

(56) References Cited

U.S. PATENT DOCUMENTS

| | | | | |
|---|---|---|---|---|
| 2008/0310338 | A1* | 12/2008 | Charpenter | H04L 1/1671 370/315 |
| 2010/0124172 | A1 | 5/2010 | Tenny et al. | |
| 2010/0124203 | A1 | 5/2010 | Tenny et al. | |
| 2010/0234026 | A1* | 9/2010 | Tenny | H04W 36/0061 455/436 |
| 2010/0272268 | A1 | 10/2010 | Sambhwani et al. | |
| 2010/0291941 | A1* | 11/2010 | Chen | H04W 36/22 455/450 |
| 2012/0302239 | A1* | 11/2012 | Hu | H04W 36/0022 455/436 |
| 2012/0315909 | A1* | 12/2012 | Nakamura | H04W 48/16 455/436 |
| 2014/0226676 | A1* | 8/2014 | Afkhami | H04L 47/626 370/412 |
| 2015/0148050 | A1* | 5/2015 | Siomina | H04J 11/005 455/452.1 |
| 2015/0305065 | A1* | 10/2015 | Bai | H04W 74/0833 370/329 |
| 2016/0165497 | A1* | 6/2016 | Tokunaga | H04W 36/0072 455/437 |

FOREIGN PATENT DOCUMENTS

| | | |
|---|---|---|
| JP | 2012-509619 | 4/2012 |
| JP | 2012-522436 | 9/2012 |
| WO | 2012138283 A2 | 10/2012 |

OTHER PUBLICATIONS

Nokia Siemens Networks et al: "Text proposal for TAU in RRC Connected and MME Load balancing", 3GPP Draft; R2-084135 (TAU and MME Load Balancing), 3rd Generation Partnership Project (3GPP), Mobile Competence Centre ; 650, Route Des Lucioles ; F-06921 Sophia-Antipolis Cedex ; France, No. Jeju; 20080812, Aug. 12, 2008 (Aug. 12, 2008), XP050319277, [retrieved on Aug. 12, 2008].
NTT Docomo et al: "Redirection enhancements to UTRAN", 3GPP Draft; 36331_CR0402R32REL-9)_R2-101940, 3rd Generation Partnership Project (3GPP), Mobile Competence Centre ; 650, Route Des Lucioles ; F-06921 Sophia-Antipolis Cedex ; France, vol. TSG GERAN, No. Jeju; 20100517, May 12, 2010 (May 12, 2010), XP050417021, [retrieved on May 12, 2010].
Ericsson et al: "Analyses of RRC Connection Handling", 3GPP Draft; R2-121520 Analyses of RRC Connection Handling, 3rd Generation Partnership Project (3GPP), Mobile Competence Centre ; 650, Route Des Lucioles ; F-06921 Sophia-Antipolis Cedex ; France, vol. RAN WG2, No. Jeju, South Korea; 20120326-20120330, Mar. 19, 2012 (Mar. 19, 2012), XP050606083, [retrieved on Mar. 19, 2012].
Alcatel-Lucent: "Position Reporting", 3GPP Draft; R3-100985_CELLREP455CR, 3rd Generation Partnership Project (3GPP), Mobile Competence Centre ; 650, Route Des Lucioles ; F-06921 Sophia-Antipolis Cedex ; France, vol. RAN WG3, No. San Francisco, USA; 20100222, Feb. 15, 2010 (Feb. 15, 2010), XP050424783, [retrieved on Feb. 15, 2010].
International Search Report, PCT/JP2014/067342, dated Sep. 16, 2014.
NTT Docomo, Inc., AT&T, Panasonic, NEC, Fujitsu, Huawei, Ericsson, ST-Ericsson, Qualcomm Incorporated, CAT, Orange, Research in Motion UK Limited, ZTE, Alcatel-Lucent, Redirection enhancements to UTRAN, 3GPP TSG-RAN WG2#69 R2-101878 Feb. 27, 2010.
Japanese Office Action dated Jan. 17, 2017; Application No. 2015-529466.

* cited by examiner

| UE ID 601 | MEASUREMENT REPORT 602 | HANDOVER NECESSITY 603 | Timing Advance type 1 or type 2 604 | RELATION WITH THRESHOLD VALUE 605 | HANDOVER INSTRUCTION DELIVERY 606 | CONNECTION RELEASE MESSAGE 607 |
|---|---|---|---|---|---|---|
| | | | | < THRESHOLD VALUE | IMPOSSIBLE | SENT |
| | | | | ≧ THRESHOLD VALUE | POSSIBLE | NOT SENT |
| ... | ... | | | | | |

Fig. 17

```
-- ASN1START

RRCConnectionReconfiguration ::=    SEQUENCE {
    rrc-TransactionIdentifier       RRC-TransactionIdentifier,
    criticalExtensions              CHOICE {
        c1                          CHOICE {
            rrcConnectionReconfiguration-r8    RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture    SEQUENCE {}
    }
}

RRCConnectionReconfiguration-r8-IEs ::= SEQUENCE {        1701
    measConfig                      MeasConfig                          OPTIONAL,    -- Need ON
    mobilityControlInfo             MobilityControlInfo                 OPTIONAL,    -- Cond HO
    dedicatedInfoNASList            SEQUENCE (SIZE(1..maxDRB)) OF
                                    DedicatedInfoNAS                    OPTIONAL,    -- Cond nonHO
    radioResourceConfigDedicated    RadioResourceConfigDedicated        OPTIONAL,    -- Cond HO-toEUTRA
    securityConfigHO                SecurityConfigHO                    OPTIONAL,    -- Cond HO
    nonCriticalExtension            RRCConnectionReconfiguration-v890-IEs OPTIONAL
}

RRCConnectionReconfiguration-v890-IEs ::= SEQUENCE {
    lateNonCriticalExtension        OCTET STRING                        OPTIONAL,    -- Need OP
    nonCriticalExtension            RRCConnectionReconfiguration-v920-IEs OPTIONAL
}

RRCConnectionReconfiguration-v920-IEs ::= SEQUENCE {
    otherConfig-r9                  OtherConfig-r9                      OPTIONAL,    -- Need ON
    fullConfig-r9                   ENUMERATED {true}                   OPTIONAL,    -- Cond HO-Reestab
    nonCriticalExtension            RRCConnectionReconfiguration-v1020-IEs OPTIONAL
}

RRCConnectionReconfiguration-v1020-IEs ::= SEQUENCE {
    sCellToReleaseList-r10          SCellToReleaseList-r10              OPTIONAL,    -- Need ON
    sCellToAddModList-r10           SCellToAddModList-r10               OPTIONAL,    -- Need ON
    nonCriticalExtension            SEQUENCE {}                         OPTIONAL     -- Need OP
}

SCellToReleaseList-r10 ::=          SEQUENCE (SIZE (1..maxSCell-r10)) OF SCellIndex-r10

SCellToAddModList-r10 ::=           SEQUENCE (SIZE (1..maxSCell-r10)) OF SCellConfig-r10

SCellConfig-r10 ::=                 SEQUENCE {
    sCellIndex-r10                  SCellIndex-r10,
    carrierFreq-r10                 ARFCN-ValueEUTRA,
    physCellId-r10                  PhysicalCellIdentity,
    sfn-Offset-r10                  INTEGER (0..1023),
    subframe-Shift-r10              INTEGER (0..9),
    ...
}

SCellIndex-r10 ::=                  INTEGER (1..maxSCell-r10)

SecurityConfigHO ::=                SEQUENCE {
    handoverType                    CHOICE {
        intraLTE                    SEQUENCE {
            securityAlgorithmConfig SecurityAlgorithmConfig             OPTIONAL,    -- Cond fullConfig
            keyChangeIndicator      BOOLEAN,
            nextHopChainingCount    NextHopChainingCount
        },
        interRAT                    SEQUENCE {
            securityAlgorithmConfig SecurityAlgorithmConfig,
            nas-SecurityParamToEUTRA OCTET STRING (SIZE(6))
        }
    },
    ...
}

-- ASN1STOP
```

COMMUNICATIONS PROCESSING SYSTEM, COMMUNICATIONS PROCESSING METHOD, COMMUNICATIONS CONTROL DEVICE, AND CONTROL METHOD AND CONTROL PROGRAM FOR THESE

TECHNICAL FIELD

The present invention relates to a technique for controlling the handover of a mobile communications terminal.

BACKGROUND ART

In the above-mentioned technical field, a handover is attempted when the quality of wireless communications deteriorates, but a control signal for issuing a handover instruction to a mobile communications terminal (UE: User Equipment) has a large data size and is therefore less likely to be delivered to the UE upon the deterioration in quality of wireless communications. When the control signal cannot be delivered to the UE and a handover results in failure, RRC Connection reestablishment is attempted upon detection of RLF (Radio Link Failure) on the UE side. When this attempt also results in failure, the UE makes a transition to the RRC_IDLE state. At the time of failure of a handover, since only information sent by a system information block (System Information Block) is used as information for a cell search, no appropriate cell can be immediately selected, so the "out of service range" state may continue.

PTL 1 discloses a technique for, if the channel shows deterioration when packet data is redirected upon failure of HARQ (hybrid automatic redirection request) from a transmitter to a receiver, re-fragmenting data of an RLC-SDU (Radio Link Control Service Data Unit) or an RLC-PDU (Radio Link Control Protocol Data Unit) into PDU data having a smaller size, and sending the re-fragmented RLC-PDU data.

CITATION LIST

Patent Literature

[PTL 1] Japanese Unexamined Patent Application Publication No. 2008-118640

SUMMARY OF INVENTION

Technical Problem

Unfortunately, in the technique described in PTL 1, since PDU data is simply re-fragmented into data having a smaller size, no clue is available to reduce the data size of a control signal itself, for issuing a handover instruction. In addition, when PDU data is re-fragmented into data having a smaller size, as mentioned in PTL 1, the number of fragments increases, so the delivery probability further lowers and a handover results in failure upon the deterioration in quality of wireless communications. In this case, no appropriate cell can be immediately selected, resulting in continuation of the "out of service range" state. This prolongs the time after call disconnection until call reconnection.

It is an object of the present invention to provide a technique for solving the above-mentioned problems.

Solution to Problem

In order to achieve the above-described object, a communications processing device according to the present invention includes a measurement report acquisition means, a wireless quality determination means, and a message transmission means. The measurement report acquisition means obtains a measurement report relating to the communications environment from a mobile communications terminal located within a cell. The wireless quality determination means determines whether or not the quality of wireless communications with the mobile communications terminal, included in the measurement report, is lower than a threshold value. If the quality of wireless communications is less than the threshold value, the message transmission means sends to the mobile communications terminal a message that has less data volume than a handover instruction message and includes a carrier frequency for a base station to be handed over.

In order to achieve the above-described object, a control method for a communications processing device according to the present invention includes a measurement report acquisition step, a wireless quality determination step, and a message transmission step. In the measurement report acquisition step, a measurement report relating to the communications environment is obtained from a mobile communications terminal located within a cell. In the wireless quality determination step, it is determined whether or not the quality of wireless communications with the mobile communications terminal, included in the measurement report, is lower than a threshold value. In the message transmission step, if the quality of wireless communications is less than the threshold value, a message that has less data volume than a handover instruction message and includes a carrier frequency for a base station to be handed over is sent to the mobile communications terminal.

In order to achieve the above-described object, a control program for a communications processing device according to the present invention causes a computer to execute a measurement report acquisition step, a wireless quality determination step, and a message transmission step. In the measurement report acquisition step, a measurement report relating to the communications environment is obtained from a mobile communications terminal located within a cell. In the wireless quality determination step, it is determined whether or not the quality of wireless communications with the mobile communications terminal, included in the measurement report, is lower than a threshold value. In the message transmission step, if the quality of wireless communications is less than the threshold value, a message that has less data volume than a handover instruction message and includes a carrier frequency for a base station to be handed over is sent to the mobile communications terminal.

In order to achieve the above-described object, a communications processing system according to the present invention includes a mobile communications terminal located within a cell, a communications processing device which accommodates the cell, a collection means, a wireless quality determination means, and a message transmission means. The collection means collects a measurement report relating to the communications environment measured by the mobile communications terminal. The wireless quality determination means determines whether or not the quality of wireless communications with the mobile communications terminal, included in the measurement report, is lower than a threshold value. If the quality of wireless communications is less than the threshold value, the message transmission means sends to the mobile communications terminal a message that has less data volume than a handover instruction message and includes a carrier frequency for a base station to be handed over.

In order to achieve the above-described object, a communications processing method according to the present invention includes a collection step, a wireless quality determination step, and a message transmission step. In the collection step, a measurement report relating to the communications environment measured by a mobile communications terminal located within a cell is collected. In the wireless quality determination step, it is determined whether or not the quality of wireless communications with the mobile communications terminal, included in the measurement report, is lower than a threshold value. In the message transmission step, if the quality of wireless communications is less than the threshold value, a message that has less data volume than a handover instruction message and includes a carrier frequency for a base station to be handed over is sent to the mobile communications terminal.

Advantageous Effect of Invention

According to the present invention, for a quality of wireless communications expected to result in handover instruction failure, the time after call disconnection until call reconnection can be reduced using a message having a higher delivery probability than a handover instruction.

BRIEF DESCRIPTION OF DRAWINGS

FIG. 6 is a table illustrating the configuration of a table used by a wireless quality determination unit according to the second exemplary embodiment of the present invention.

FIG. 17 is a view illustrating the configuration of an RRC Connection Reconfiguration message that is a handover instruction message sent from the existing communications processing device to a mobile communications terminal.

DESCRIPTION OF EMBODIMENTS

Exemplary embodiments of the present invention will be typically described in detail below with reference to the accompanying drawings. Note, however, that components described in the following exemplary embodiments are merely examples and are not intended to limit the technical scope of the present invention only to them.

First Exemplary Embodiment

A communications processing device 100 according to a first exemplary embodiment of the present invention will be described below with reference to FIG. 1. The communications processing device 100 controls the handover of a mobile communications terminal.

Figure 1:
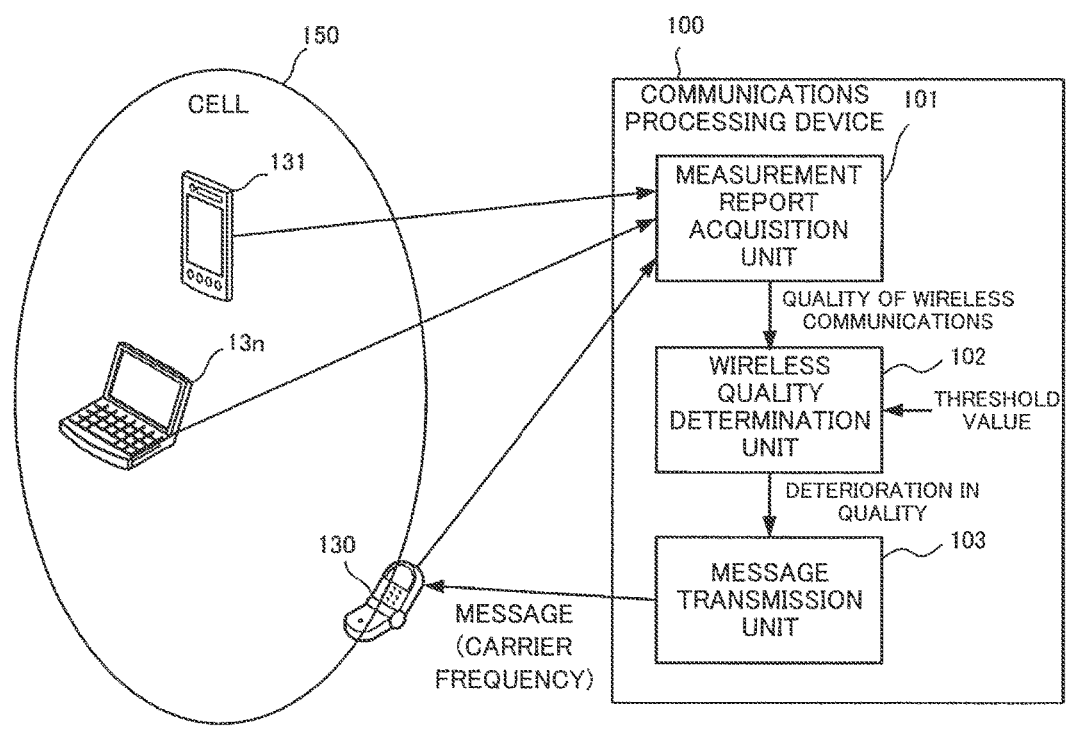
FIG. 1 is a block diagram illustrating the configuration of a communications processing device according to a first exemplary embodiment of the present invention.

The communications processing device 100 includes a measurement report acquisition unit 101, a wireless quality determination unit 102, and a message transmission unit 103, as illustrated in FIG. 1. The measurement report acquisition unit 101 obtains a measurement report relating to the communications environment from each of mobile communications terminals 130 to 13n located within a cell 150. The wireless quality determination unit 102 determines whether or not the quality of wireless communications with each of the mobile communications terminals 130 to 13n, included in the measurement report, is lower than a threshold value. If the quality of wireless communications is less than the threshold value, the message transmission unit 103 sends to the mobile communications terminal 130 a message that has less data volume than a handover instruction message and includes the carrier frequency for the base station to be handed over.

According to this exemplary embodiment, for a quality of wireless communications expected to result in handover instruction failure, the time after call disconnection until call reconnection can be reduced using a message having a higher delivery probability than a handover instruction.

Second Exemplary Embodiment

A communications processing device according to a second exemplary embodiment of the present invention will be described next. An eNodeB serving as the communications processing device according to this exemplary embodiment collects a measurement report measured and sent by a UE (User Equipment) serving as a mobile communications terminal. The eNodeB then determines whether or not the value of Timing Advance type 1 or type 2 included in the measurement report is lower than a threshold value. If the value of Timing Advance type 1 or type 2 is less than the threshold value, the eNodeB estimates that the quality of wireless communications has so lowered that a handover instruction cannot be delivered. An MME (Mobility Management Entity) is notified of release of the mobile communications terminal from the cell. Upon receiving, from the MME, an instruction to release the UE from the cell, the eNodeB sends to the corresponding UE an RRC Connection Release message defined in 3GPP TS 36.331. A carrier frequency to be handed over is set in redirectedCarrierInfo serving as an information element of the RRC Connection Release message. In other words, for a quality of wireless communications that results in handover instruction failure, an instruction for redirection to a cell of LTE is issued using a message having a small RLC-SDU size to raise the probability of delivery to the UE. Further, the carrier frequency is sent using a message having a high delivery probability to suppress any wasteful cell search of the UE.

<<Background Art>>

In order to clarify the object and advantageous effect of this exemplary embodiment, the background art will be briefly descried below with reference to FIGS. 16 and 17.

Figure 16:
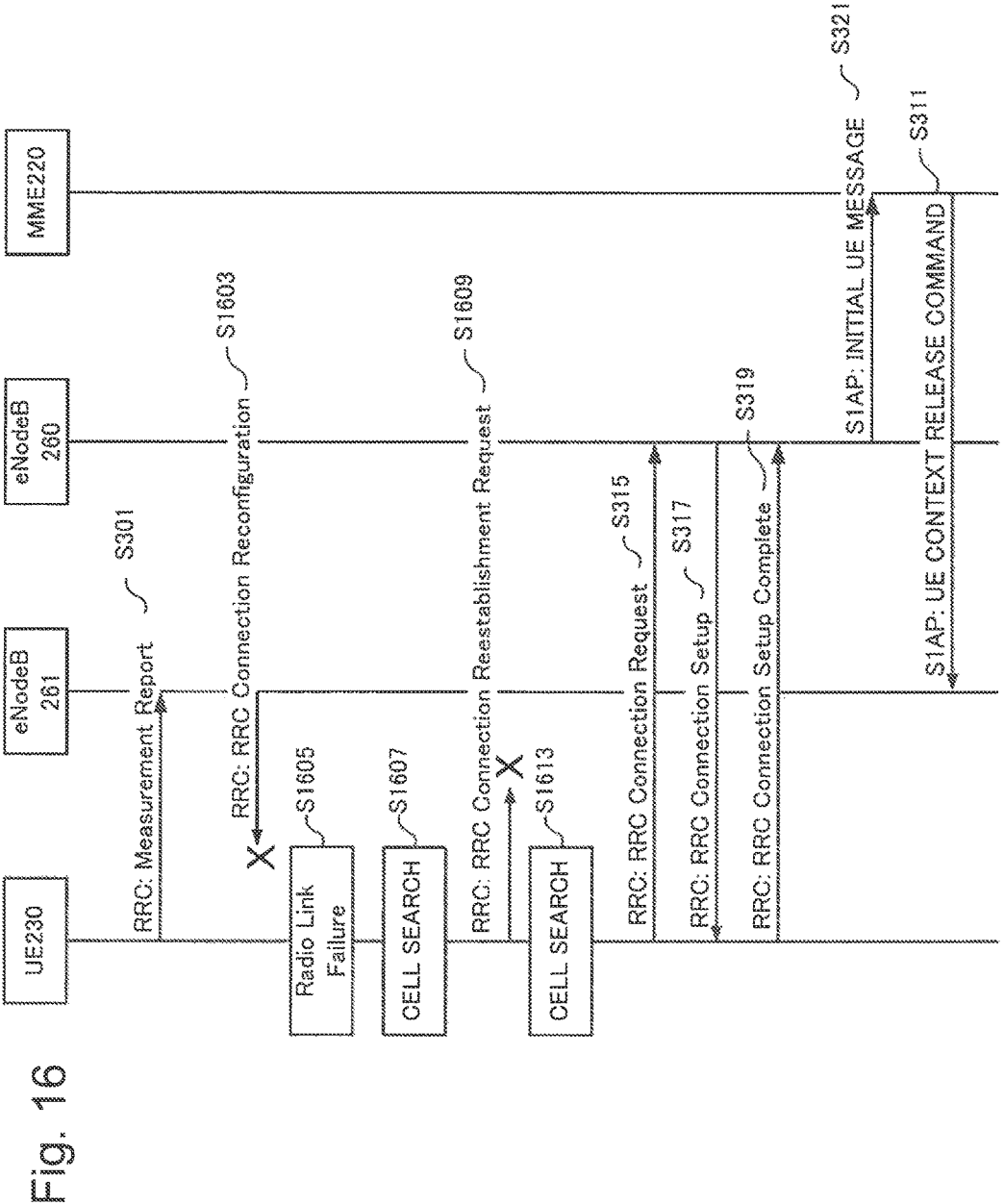
FIG. 16 is a sequence chart illustrating the operation procedure of the communications processing system including the existing communications processing devices.

FIG. 16 is a sequence chart illustrating the operation procedure of the communications processing system including the existing communications processing devices. The same step numbers as in FIGS. 3 and 12 denote the same steps in FIG. 16, common to those in FIG. 3.

In this technical field, when it becomes impossible to maintain the established connection (RRC Connection) due to movement of the UE or a change in ambient radio wave environment, the eNodeB issues a wireless quality measurement instruction to the UE in advance to perform handover control. As described in, for example, TS 36.300 10.1.2.1 as a standard convention, the UE reports the measurement result using Measurement Report serving as an RRC protocol message (step S301). The eNodeB determines based on the reported value a cell at the handover destination and issues a handover instruction to the UE using RRC Connection Reconfiguration serving as an RRC protocol message in which mobilityControlInformation serving as an information element is set (step S1603).

However, since RRC Connection Reconfiguration has a large RLC-SDU size, data of an RLC-PDU is fragmented and transmitted, so the delivery probability is lower than a message having a small RLC-SDU size upon the deterioration in quality of wireless communications. When delivery of RRC Connection Reconfiguration results in failure, and the quality of wireless communications with the UE further deteriorates, the UE detects Radio Link Failure (step S1605) and attempts to maintain RRC connection by the procedure of RRC Connection reestablishment. With this procedure, a cell at the reconnection destination is selected by a cell search (step S1607) and transmission of RRC Connection Reestablishment Request serving as an RRC protocol message is attempted (step S1609). When cell selection by the cell search (step S1607) results in failure or RRC Connection Reestablishment Request (step S1609) cannot be delivered to the eNodeB, the UE makes a transition to the RRC_IDLE state. The UE performs a cell search (step S1613) and attempts to establish new RRC connection (steps S315-S319).

When RRC connection can be established, the eNodeB sends INITIAL UE MESSAGE serving as an S1AP protocol message to the MME (step S321). If the MME possesses the information of the corresponding UE, it restores connection in the NAS protocol layer and sends UE CONTEXT RELEASE COMMAND to issue a UE Context release request to the old eNodeB (step S311).

In this operation, in step S1605 and subsequent steps, if the UE possesses no carrier frequency for a cell suitable as a connection destination, a cell search may result in failure. Depending on the operational form of the telecommunications carrier, the UE generally remains inhibited from handling outgoing and incoming calls, except for urgent outgoing calls, until it camps in a suitable cell. This poses a problem that communications is impossible until bearer establishment is completed in the procedure of step S321 and subsequent steps.

FIG. 17 is a view illustrating the configuration of an RRC Connection Reconfiguration message 1700 that is a handover instruction message sent from the existing communications processing device to a mobile communications terminal. Referring to FIG. 17, mobilityControlInformation 1701 serving as an information element is used to trigger a handover process.

<<Communications Processing System>>

The configuration and operation of a communications processing system including communications processing devices according to this exemplary embodiment will be described below with reference to FIGS. 2 to 4.

<<Operation Overview>>

Figure 2:
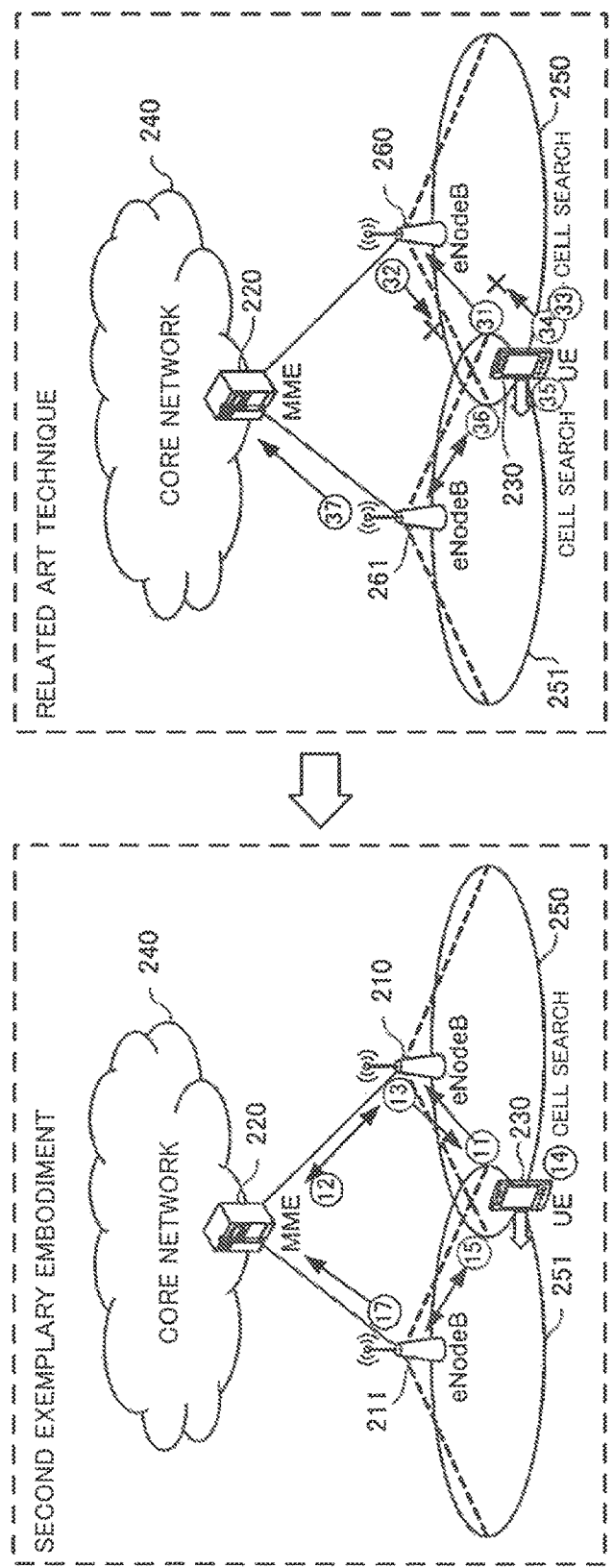
FIG. 2 is a view illustrating an operation overview of a communications processing system including communications processing devices according to a second exemplary embodiment of the present invention.

FIG. 2 is a view illustrating an operation overview of a communications processing system including communications processing devices 210 and 211 according to this exemplary embodiment. FIG. 2 shows the operation according to this exemplary embodiment, in contrast to that according to the related art technique.

The communications processing system according to this exemplary embodiment includes wireless base stations (eNodeBs) 210 and 211 serving as communications processing devices, a mobile management device (MME) 220, a mobile communications terminal (UE) 230, and a core network (CN) 240, as illustrated in FIG. 2. The communications processing system also includes a cell 250 accommodated in the eNodeB 210 and a cell 251 accommodated in the eNodeB 211.

The communications processing system according to this exemplary embodiment operates in the following way: (11) A measurement report (Measurement Report) is sent from the UE 230 to the eNodeB 210; (12) If the eNodeB 210 determines that a control signal for issuing a handover instruction cannot be delivered to the UE 230 because of deterioration in quality of wireless communications, it executes the procedure of S1AP: UE CONTEXT RELEASE together with the MME 220; (13) The eNodeB 210 sends to the UE 230 an RRC: RRC Connection Release message including a handover carrier frequency; (14) The UE 230 performs a cell search using the handover carrier frequency to find the cell 251; (15) The UE 230 executes the procedure of RRC Connection establishment together with the eNodeB 211; and (16) When the eNodeB 211 completes the RRC Connection establishment, it sends S1AP: INITIAL UE MESSAGE to the MME 220 to register that the UE 230 is under the control of the eNodeB 211.

The communications processing system according to the related art technique includes wireless base stations (eNodeBs) 260 and 261 which operate differently from the communications processing system according to this exemplary embodiment, but these communications processing systems are the same in other components.

The communications processing system according to the related art technique operates in the following way: (31) A measurement report (Measurement Report) is sent from the UE 230 to the eNodeB 210; (32) If the eNodeB 260 determines that a handover from the cell 250 to the cell 251 is appropriate, it attempts to send an RRC: RRC Connection Reconfiguration message to the UE 230; however, when the quality of wireless communications has deteriorated, the RRC: RRC Connection Reconfiguration message cannot be delivered to the UE 230; (33) The UE 230 detects failure of a radio link to the eNodeB 260 and performs a cell search using information sent by a system information block (System Information Block); (34) The UE 230 issues an RRC: RRC Connection Reestablishment request based on the cell search result, but makes a transition to the RRC_IDLE state due to failure of a cell search or connection reestablishment; (35) The UE 230 performs a cell search using the information sent by the system information block (System Information Block), again as new service range processing for a cell to find the cell 251; (36) The UE 230 executes the procedure of RRC Connection establishment together with the eNodeB 261; and (37) When the eNodeB 261 completes the RRC Connection establishment, it sends S1AP: INITIAL UE MESSAGE to the MME 220 to register that the UE 230 is under the control of the eNodeB 261.

(Operation Procedure)

Figure 3:
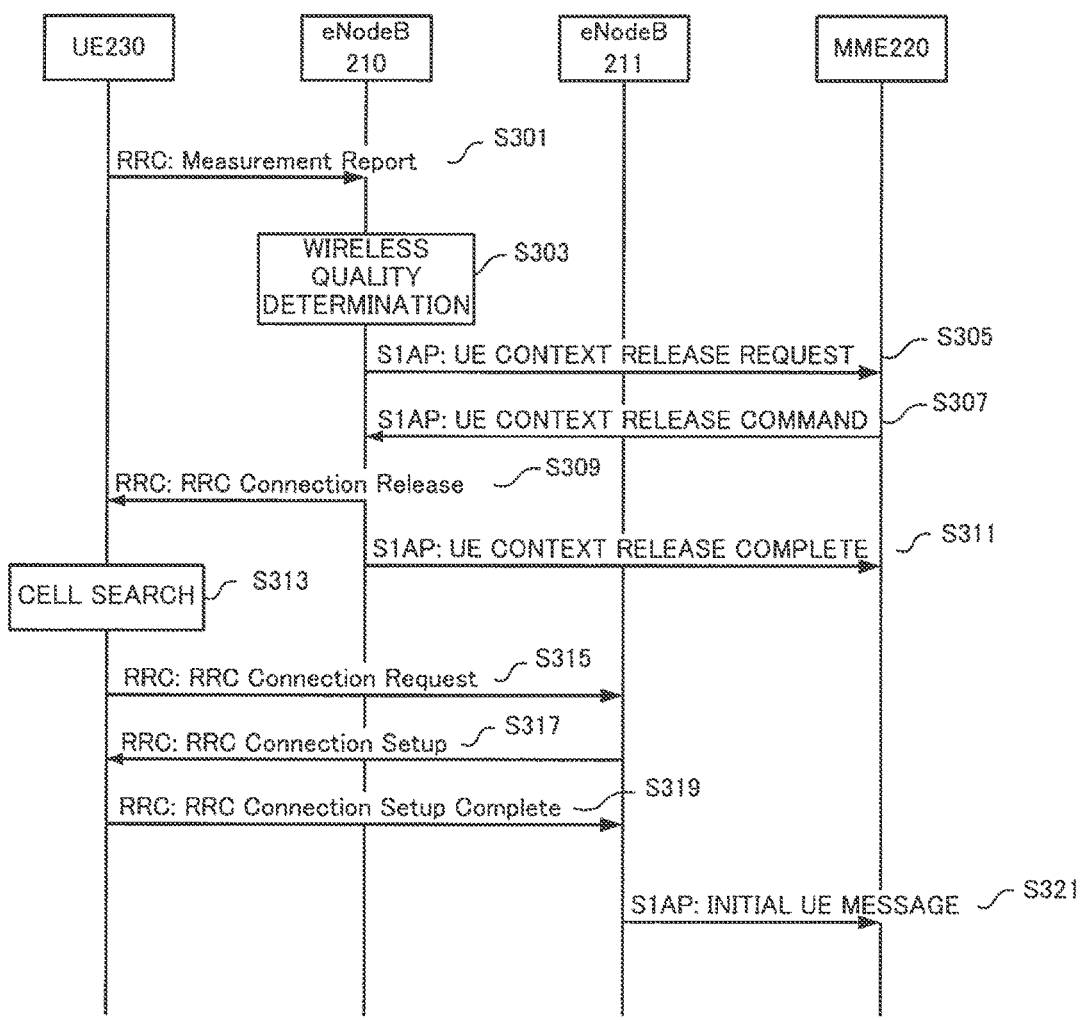
FIG. 3 is a sequence chart illustrating the operation procedure of the communications processing system including the communications processing devices according to the second exemplary embodiment of the present invention.

FIG. 3 is a sequence chart illustrating the operation procedure of the communications processing system including the communications processing devices 210 and 211 according to this exemplary embodiment. FIG. 3 illustrates the detailed procedure passed between respective components in this exemplary embodiment.

When the eNodeB 210 receives Measurement Report serving as an RRC protocol message sent from the UE 230 (step S301), the eNodeB 210 determines the quality of wireless communications (step S303). The wireless quality determination in step S303 uses Timing Advance type 1 or type 2 as an index. Timing Advance serves as a measurement index defined as a standard in TS 36.214. The eNodeB 210 obtains the value of Timing Advance Type 1 or type 2 for the UE 230. The eNodeB 210 holds a Timing Advance threshold value for each cell. If the Timing Advance value of the UE 230 is lower than the Timing Advance threshold value for the cell 250, the eNodeB 210 determines that a control signal for issuing a handover instruction cannot be delivered to the UE 230.

If it is determined that the control signal cannot be delivered, the eNodeB 210 sends UE CONTEXT RELEASE REQUEST serving as an S1AP protocol message to the MME 220 (step S305). At this time, the MME 220 may be notified that this processing is executed by S1 Cause of Information Element. When the eNodeB 210 receives UE CONTEXT RELEASE COMMAND from the MME 220 (step S307), it creates and sends RRC Connection Release serving as an RRC protocol message to the UE 230 (step S309). This RRC Connection Release message includes Information Element in which the carrier frequency of the wireless system is set (for example, the carrier frequency of LTE is set in redirectedCarrierInfo). The UE 230 performs a cell search in accordance with the received carrier frequency information (step S313) and implements RRC connection to the eNodeB 211 that accommodates the appropriate cell 251 (steps S315, S317, & S319).

After RRC connection establishment, the eNodeB 211 sends INITIAL UE MESSAGE serving as an S1AP protocol message to the MME 220 (step S321) and starts bearer establishment. The subsequent bearer establishment procedure complies with the details defined as standards in, for example, 3GPP TS 36.300, TS 36.331, or TS 36.413, and a detailed description thereof will not be given.

(Operation Timing)

Figure 4:
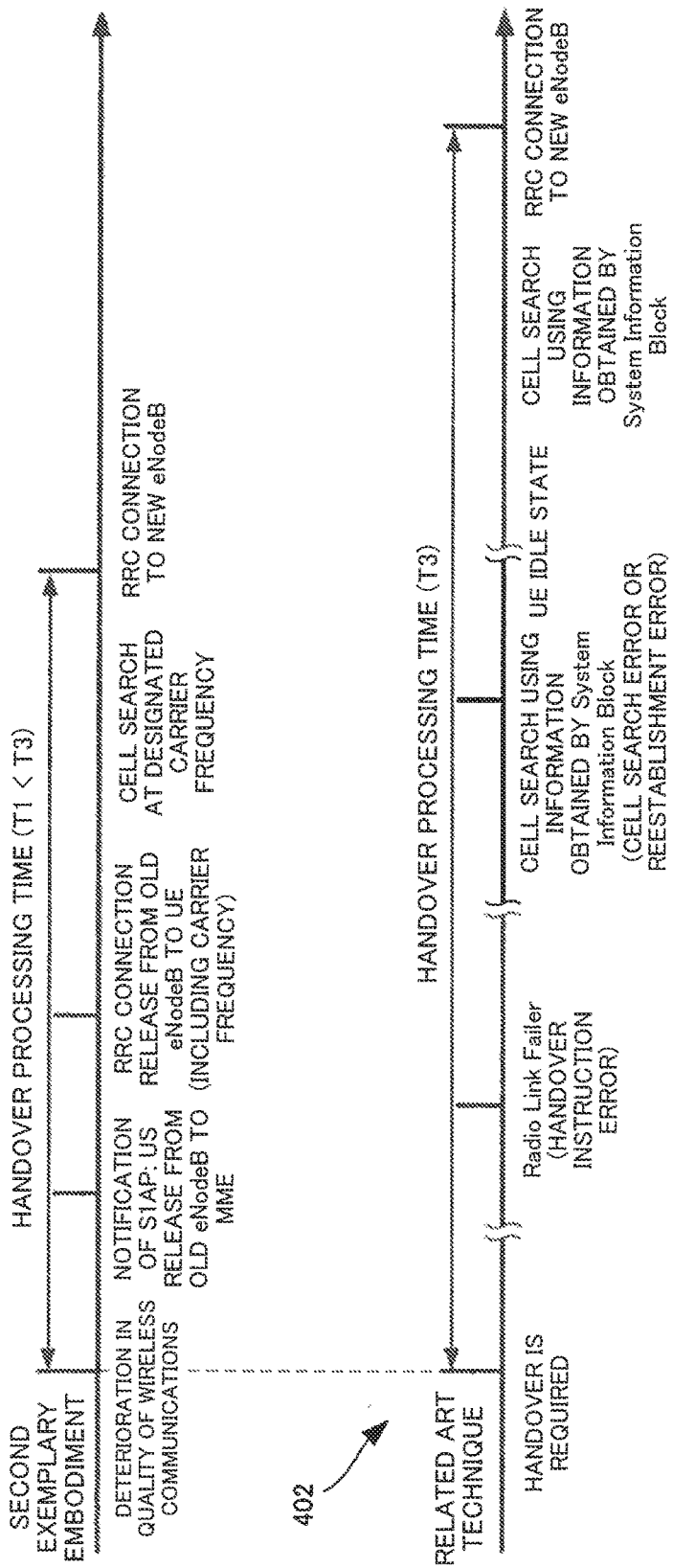
FIG. 4 is a timing chart illustrating the operation timing of the communications processing system including the communications processing devices according to the second exemplary embodiment of the present invention.

FIG. 4 is a timing chart illustrating the operation timing of the communications processing system including the communications processing devices 210 and 211 according to this exemplary embodiment. FIG. 4 shows in the upper stage, handover processing 401 which maintains service range information for the MME 220 according to this exemplary embodiment, and in the lower stage, handover processing 402 according to the related art technique. The elapsed time in FIG. 4 represents an approximate elapsed time and is not a precise elapsed time.

The time (T1) of the handover processing 401 according to this exemplary embodiment is greatly shorter than the time (T3) of the handover processing 402 according to the related art technique. This is because the handover processing 402 according to the related art technique includes handover failure, two cell searches that use information sent by the system information block (System Information Block), and the UE IDLE state. In other words, the handover processing 402 includes various types of processing which require uncertain processing times. In addition, the handover processing 402 according to the related art technique includes the UE IDLE state in which the UE 230 is disconnected from the communications processing system.

<<Functional Configuration of Communications Processing Device>>

Figure 5:
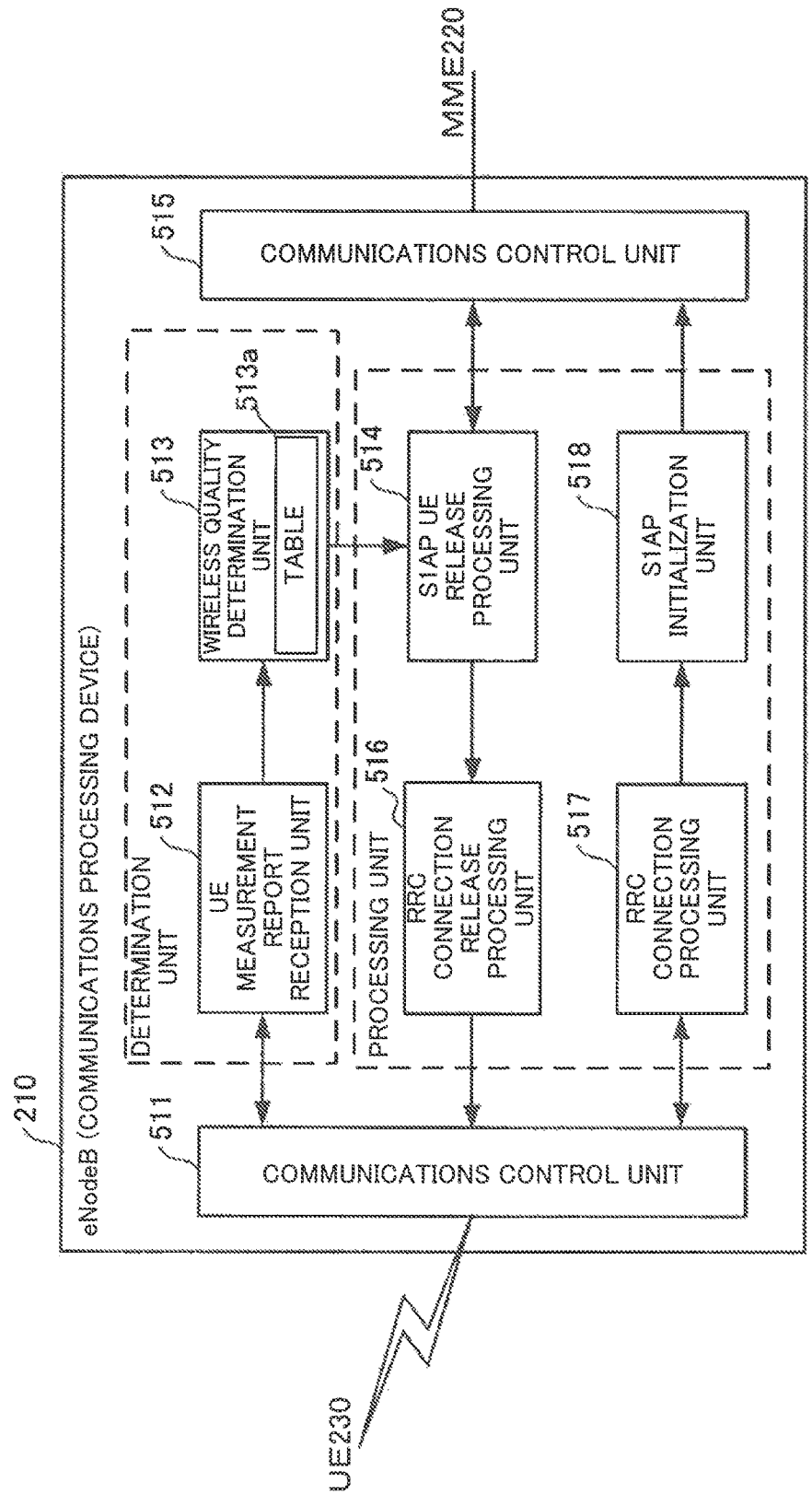
FIG. 5 is a block diagram illustrating the functional configuration of the communications processing device according to the second exemplary embodiment of the present invention.

FIG. 5 is a block diagram illustrating the functional configuration of the communications processing device 210 according to this exemplary embodiment. Since the communications processing devices 210 and 211 have the same configuration, the communications processing device 210 will be described as a representative example. FIG. 5 illustrates the functional configuration units of the communications processing device 210 according to this exemplary embodiment and does not illustrate the general functional configuration units needed as an eNodeB.

The communications processing device 210 includes a communications unit, a determination unit, and a processing unit. The communications unit receives and sends various 3GPP messages such as wireless quality reports from the UE 230, RRC protocol messages, and S1AP protocol messages. The determination unit determines the necessity of handover execution based on the quality of wireless communications received by the communications unit, and success or failure of handover execution. The processing unit creates a message to be sent from the communications unit, based on the result obtained by the determination unit. The determination unit, the processing unit, and the communications unit may be implemented in software or hardware. Moreover, respective units may be implemented in different types of software or hardware or partially or wholly implemented in the same types of software or hardware. Furthermore, respective units may be implemented as part of software or hardware which implements other functions of a network device. The functional configuration units are implemented in software by executing a program while temporarily storing data in an area secured in a RAM, using data and parameters in a storage device for nonvolatile storage by the CPU for arithmetic processing.

The communications unit of the communications processing device 210 includes a communications control unit 511 which controls communications with the UE 230, and a communications control unit 515 which controls communications with the MME 220.

The determination unit of the communications processing device 210 includes a UE measurement report reception unit 512 which receives a measurement report from the UE 230 via the communications control unit 511, and a wireless quality determination unit 513 which determines deterioration in quality of wireless communications that results in handover failure, based on information relevant to the quality of wireless communications in the measurement report. The wireless quality determination unit 513 includes a table 513a used to determine deterioration in quality of wireless communications.

The processing unit of the communications processing device 210 includes an S1AP•UE release processing unit 514, an RRC connection release processing unit 516, an RRC connection processing unit 517, and an S1AP initialization unit 518. The S1AP•UE release processing unit 514 executes a series of processing of S1AP: UE CONTEXT RELEASE together with the MME 220 in response to a notification of deterioration in quality of wireless communications from the wireless quality determination unit 513. The RRC connection release processing unit 516 sends to the UE 230 an RRC: RRC Connection Release message including the carrier frequency of the handover destination when the S1AP•UE release processing unit 514 receives S1AP: UE CONTEXT RELEASE COMMAND from the MME 220. The RRC connection processing unit 517 executes a series of processing that replies to RRC: RRC Connection Request from the UE 230, as a result of a cell search at the carrier frequency of the handover destination. The S1AP initialization unit 518 registers in the MME 220, the result of service range connection into the cell of a new UE 230.

<<Table Used by Wireless Quality Determination Unit>>

FIG. 6 is a table illustrating the configuration of the table 513a used by the wireless quality determination unit 513 according to this exemplary embodiment. The table 513a is used by the wireless quality determination unit 513 to determine deterioration in quality of wireless communications that results in handover failure, based on information relevant to the quality of wireless communications in the measurement report.

The table 513a stores a measurement report 602 from each UE, a handover necessity 603 determined based on the measurement report 602, and data 604 of Timing Advance type 1 or type 2 in the measurement report 602, in association with a UE_ID 601. The table 513a also stores the data 604, a relation 605 with a specific threshold value held in each eNodeB to determine deterioration in quality of wireless communications that results in handover failure within the cell 250 accommodated in the communications processing device 210, and a handover instruction delivery state (possible/impossible) 606 based on the relation 605. The table 513a stores information 607 as to whether to send a connection release message to the UE 230, in correspondence with the determination result of the handover instruction delivery state (possible/impossible) 606.

(RRCConnectionRelease Message)

Figure 7:
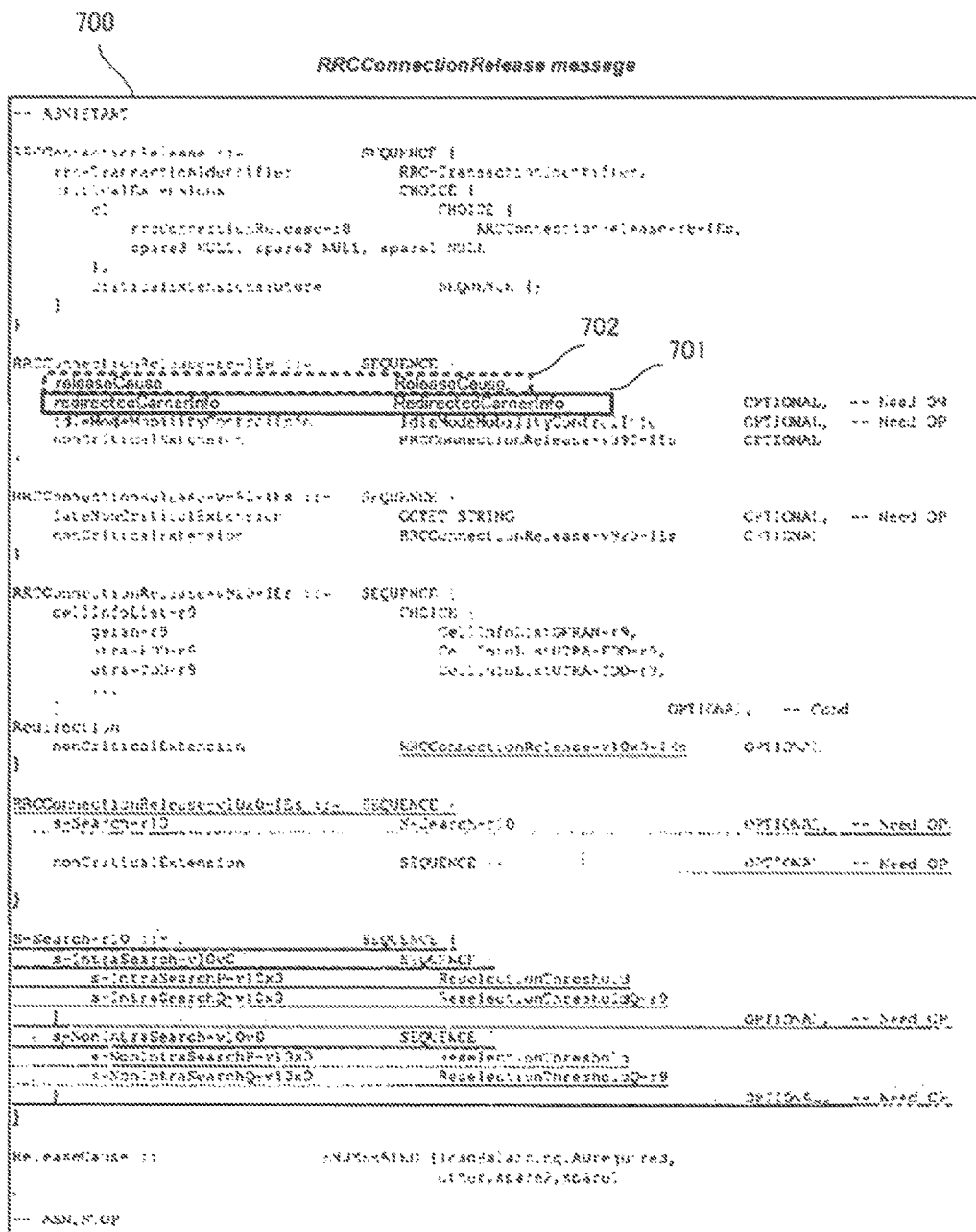
FIG. 7 is a view illustrating the configuration of an RRCConnectionRelease message that is a connection release message sent from an RRC connection release processing unit according to the second exemplary embodiment of the present invention to a mobile communications terminal.

FIG. 7 is a view illustrating the configuration of an RRCConnectionRelease message 700 that is a connection release message sent from the RRC connection release processing unit according to this exemplary embodiment to the mobile communications terminal. The RRCConnectionRelease message 700 is changed by the update of the standard specification and therefore is not limited to that illustrated in FIG. 7.

The RRCConnectionRelease message 700, in this exemplary embodiment, includes a redirectedCarrierInfo region 701 including the carrier frequency of the handover destination, and a releaseCause region 702 including factors according to which the RRCConnectionRelease message 700 is sent.

<<Processing Procedure of Communications Processing Device>>

Figure 8:
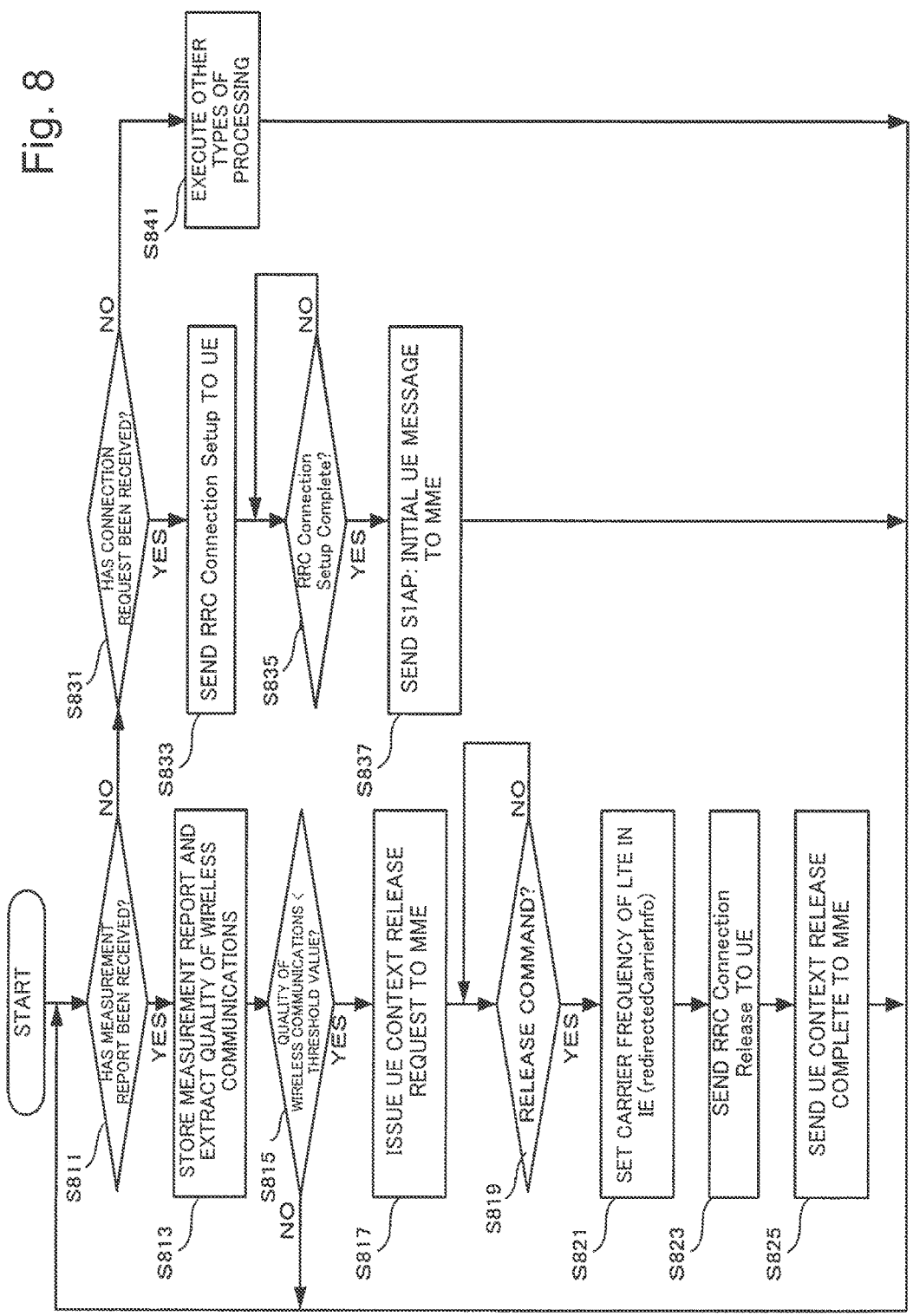
FIG. 8 is a flowchart illustrating the processing procedure of the communications processing device according to the second exemplary embodiment of the present invention.

FIG. 8 is a flowchart illustrating the processing procedure of the communications processing device 210 according to this exemplary embodiment. This flowchart is executed using the RAM by the CPU of the communications processing device 210 to implement the functional configuration units illustrated in FIG. 5.

The communications processing device 210 determines in step S811 whether a measurement report has been received from the mobile communications terminal (UE) 230. The communications processing device 210 also determines in step S831 whether a connection request (RRC Connection Request) has been received from the mobile communications terminal 230. If neither a measurement report nor a connection request has been received, the communications processing device 210 executes other types of processing in step S841.

If it is determined in step S811 that a measurement report has been received, in step S813 the communications processing device 210 stores the measurement report in association with the mobile communications terminal 230 and extracts data relevant to the quality of wireless communications from the measurement report. The communications processing device 210 determines in step S815 whether the quality of wireless communications is lower than a threshold value for determining deterioration in quality of wireless communications that results in handover failure. If the quality of wireless communications is equal to or higher than the threshold value, the communications processing device 210 returns to step S811, in which it continues the processing.

If the quality of wireless communications is less than the threshold value, the communications processing device 210 sends UE CONTEXT RELEASE REQUEST to the MME 220 in step S817. In step S819, the communications processing device 210 waits for UE CONTEXT RELEASE COMMAND from the MME 220. Upon receiving UE CONTEXT RELEASE COMMAND, the communications processing device 210 sets a carrier frequency in redirectedCarrierInfo serving as an information element (IE) of an RRC Connection Release message in step S821 and sends it to the UE 230 in step S823. In step S819, the communications processing device 210 sends UE CONTEXT RELEASE COMPLETE to the MME 220.

If it is determined in step S831 that a connection request has been received, the communications processing device 210 sends RRC Connection Setup to the UE 230 in step S833. In step S835, the communications processing device 210 stands by to receive RRC Connection Setup Complete from the UE 230. Upon receiving RRC Connection Setup Complete, the communications processing device 210 sends S1AP: INITIAL UE MESSAGE to the MME 220 in step S837.

<<Processing Procedure of Mobile Communications Terminal>>

Figure 9:
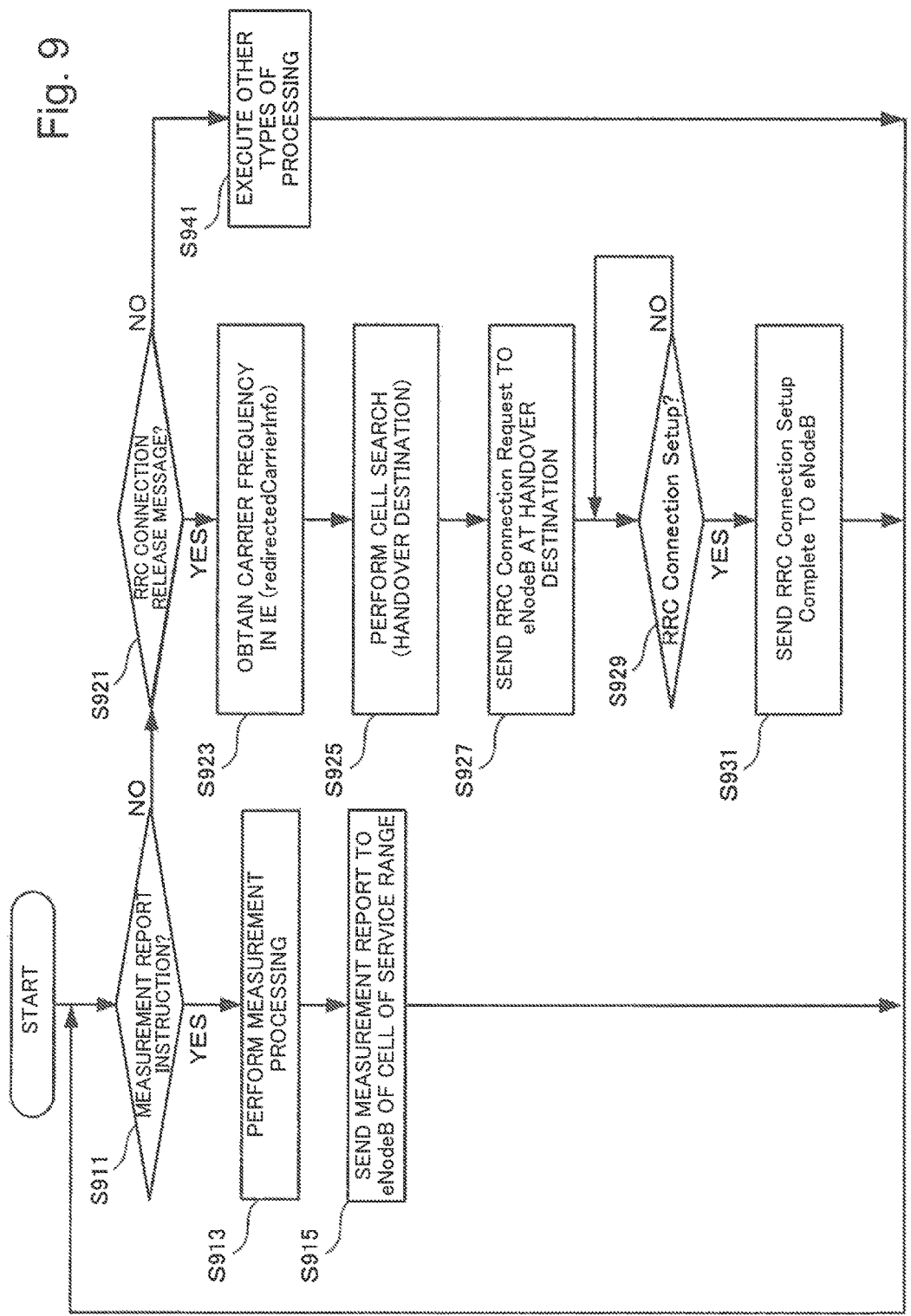
FIG. 9 is a flowchart illustrating the processing procedure of the mobile communications terminal according to the second exemplary embodiment of the present invention.

FIG. 9 is a flowchart illustrating the processing procedure of the mobile communications terminal 230 according to this exemplary embodiment. This flowchart is executed using the RAM by the CPU of the mobile communications terminal 230 to implement the functional configuration units of the mobile communications terminal 230.

The mobile communications terminal 230 determines in step S911 whether a measurement report instruction has been received from the communications processing device (eNodeB) 210. The mobile communications terminal 230 also determines in step S921 whether an RRC Connection Release message (RRC: RRC Connection Release) has been received. If neither a measurement report instruction nor a Connection Release message has been received, the mobile communications terminal 230 executes other types of processing in step S941.

If it is determined in step S911 that a measurement report instruction has been received, the mobile communications terminal 230 executes measurement processing in step S913. In step S915, the mobile communications terminal 230 sends a measurement report to the communications processing device 210 that accommodates the cell of the service range.

If it is determined in step S921 that an RRC Connection Release message has been received, the mobile communications terminal 230 obtains a carrier frequency from redirectedCarrierInfo serving as an information element (IE) of the received RRC Connection Release message in step S923. In step S925, the mobile communications terminal 230 executes a cell search using the carrier frequency obtained from redirectedCarrierInfo.

When a handover destination is obtained by a cell search, in step S927 the mobile communications terminal 230 sends RRC Connection Request to the communications processing device 211 at the handover destination in this exemplary embodiment. In step S929, the mobile communications terminal 230 stands by to receive RRC Connection Setup from the communications processing device 211. Upon receiving RRC Connection Setup, the mobile communications terminal 230 sends RRC Connection Setup Complete to the communications processing device 211 in step S931.

<<Processing Procedure of Mobility Management Entity>>

Figure 10:
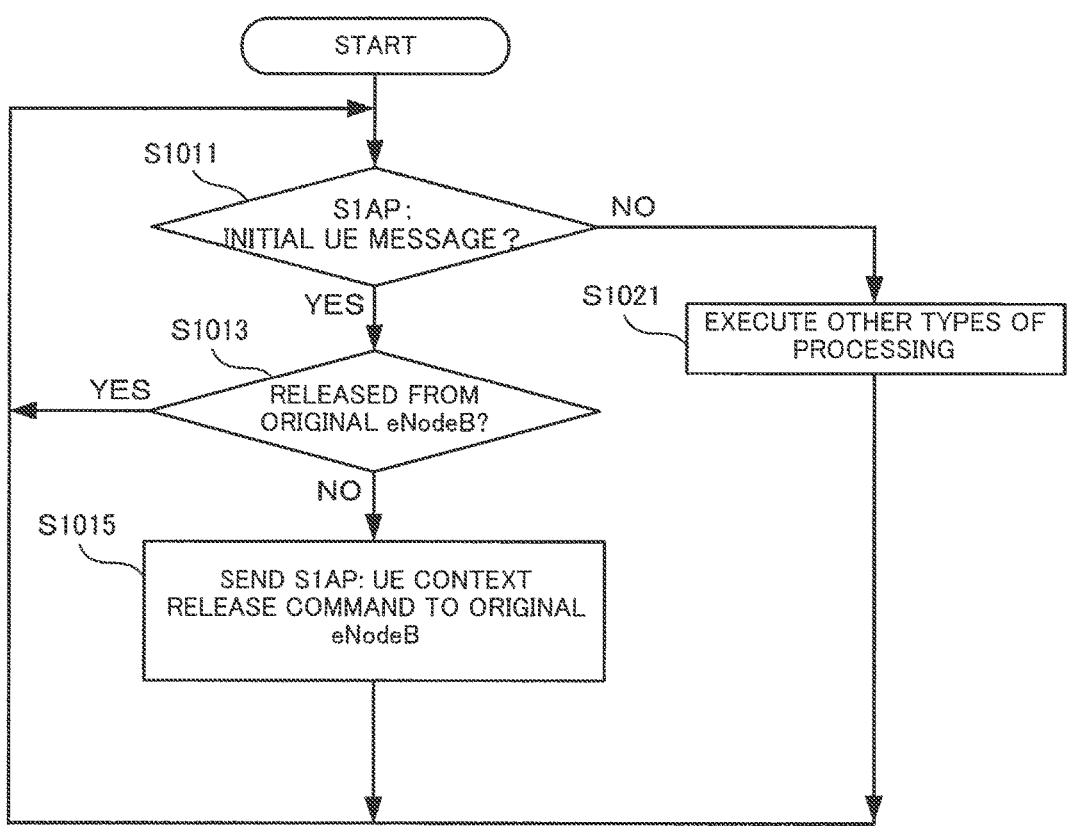
FIG. 10 is a flowchart illustrating the processing procedure of a mobility management entity according to the second exemplary embodiment of the present invention.

FIG. 10 is a flowchart illustrating the processing procedure of a mobility management entity 220 according to this exemplary embodiment. This flowchart is executed using the RAM by the CPU of the mobility management entity 220 to implement the functional configuration units of the mobility management entity 220.

In step S1011, the mobility management entity 220 determines whether S1AP: INITIAL UE MESSAGE has been received from the communications processing device (eNodeB). If S1AP: INITIAL UE MESSAGE has not been received, the mobility management entity 220 executes other types of processing in step S1021.

If it is determined in step S1011 that S1AP: INITIAL UE MESSAGE has been received, the mobility management entity 220 determines in step S1013 whether the UE 230 has undergone release processing from, in this exemplary embodiment, the original communications processing device 210 having been connected to the UE 230. If the UE 230 has undergone the release processing, the mobility management entity 220 returns to step S1011, in which it continues processing.

If the UE 230 has not undergone the release processing, in step S1015 the mobility management entity 220 sends S1AP: UE CONTEXT RELEASE COMMAND to, in this exemplary embodiment, the original communications processing device 210 having been connected to the UE 230.

According to this exemplary embodiment, for a quality of wireless communications that results in handover instruction failure, an instruction for redirection to a cell of LTE is issued using a message having a small RLC-SDU size to raise the probability of delivery to the UE. Further, the carrier frequency is sent using a message having a high delivery probability to suppress any wasteful cell search of the UE.

More specifically, when delivery of a handover instruction message for cell movement may result in failure due to deterioration in quality of wireless communications, a message having a higher delivery probability than a handover instruction can be used to enable the UE to designate a carrier frequency for a cell suitable as a call establishment destination. Therefore, for a quality of wireless communications expected to result in handover instruction failure, the time after call disconnection until call reconnection can be reduced.

Third Exemplary Embodiment

A communications processing device according to a third exemplary embodiment of the present invention will be described next. In the above-mentioned second exemplary embodiment, IE: redirectedCarrierInfo of RRC Connection Release is set to perform Redirection. However, the communications processing device according to this exemplary embodiment provides a similar effect by causing the UE to perform Tracking Area Update without sending a release signal to the MME to recover NAS (Non Access Stratum) serving as an upper layer protocol. Since other configurations and operations are the same as in the second exemplary embodiment, the same reference numerals denote the same configurations and operations, and a detailed description thereof will not be given.

<<Communications Processing System>>

The configuration and operation of a communications processing system including communications processing devices according to this exemplary embodiment will be described below with reference to FIGS. 11 to 13.

(Operation Overview)

Figure 11:
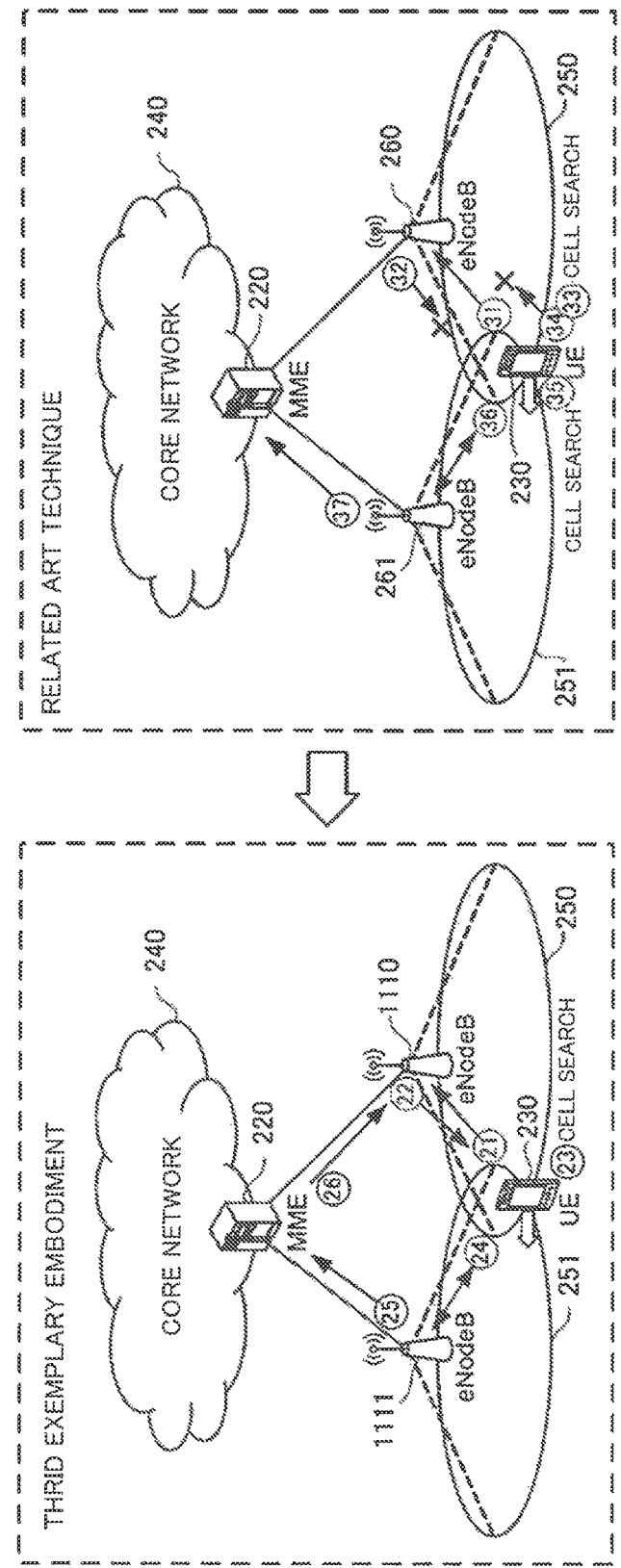
FIG. 11 is a view illustrating an operation overview of a communications processing system including communications processing devices according to a third exemplary embodiment of the present invention.

FIG. 11 is a view illustrating an operation overview of a communications processing system including communications processing devices 1110 and 1111 according to this exemplary embodiment. The same reference numerals as in FIG. 2 denote the same elements and processes in FIG. 11, and a description thereof will not be given. The configuration and operation of the communications processing system according to the related art technique illustrated in the right part of FIG. 11 are the same as in FIG. 2, and a description thereof will not be given.

The communications processing system according to this exemplary embodiment includes wireless base stations (eNodeBs) 1110 and 1111 serving as communications processing devices, a mobile management device (MME) 220, a mobile communications terminal (UE) 230, and a core network (CN) 240, as illustrated in FIG. 11. The communications processing system also includes a cell 250 accommodated in the eNodeB 1110 and a cell 251 accommodated in the eNodeB 1111.

The communications processing system according to this exemplary embodiment operates in the following way: (21) A measurement report (Measurement Report) is sent from the UE 230 to the eNodeB 1110; (22) If the eNodeB 1110 determines that a control signal for issuing a handover instruction cannot be delivered to the UE 230 because of deterioration in quality of wireless communications, the eNodeB 1110 sends to the UE 230 an RRC: RRC Connection Release message including a handover carrier frequency; (23) The UE 230 performs a cell search using the handover carrier frequency to find the cell 251; (24) The UE 230 executes the procedure of RRC Connection establishment together with the eNodeB 1111; (25) When the eNodeB 1111 completes the RRC Connection establishment, it sends S1AP: INITIAL UE MESSAGE to the MME 220 to register that the UE 230 is under the control of the eNodeB 1111; and (26) The MME 220 has not yet complete the release processing of the UE 230 in the eNodeB 1110 and therefore sends S1AP: UE CONTEXT RELEASE COMMAND to the eNodeB 1110.

(Operation Procedure)

Figure 12:
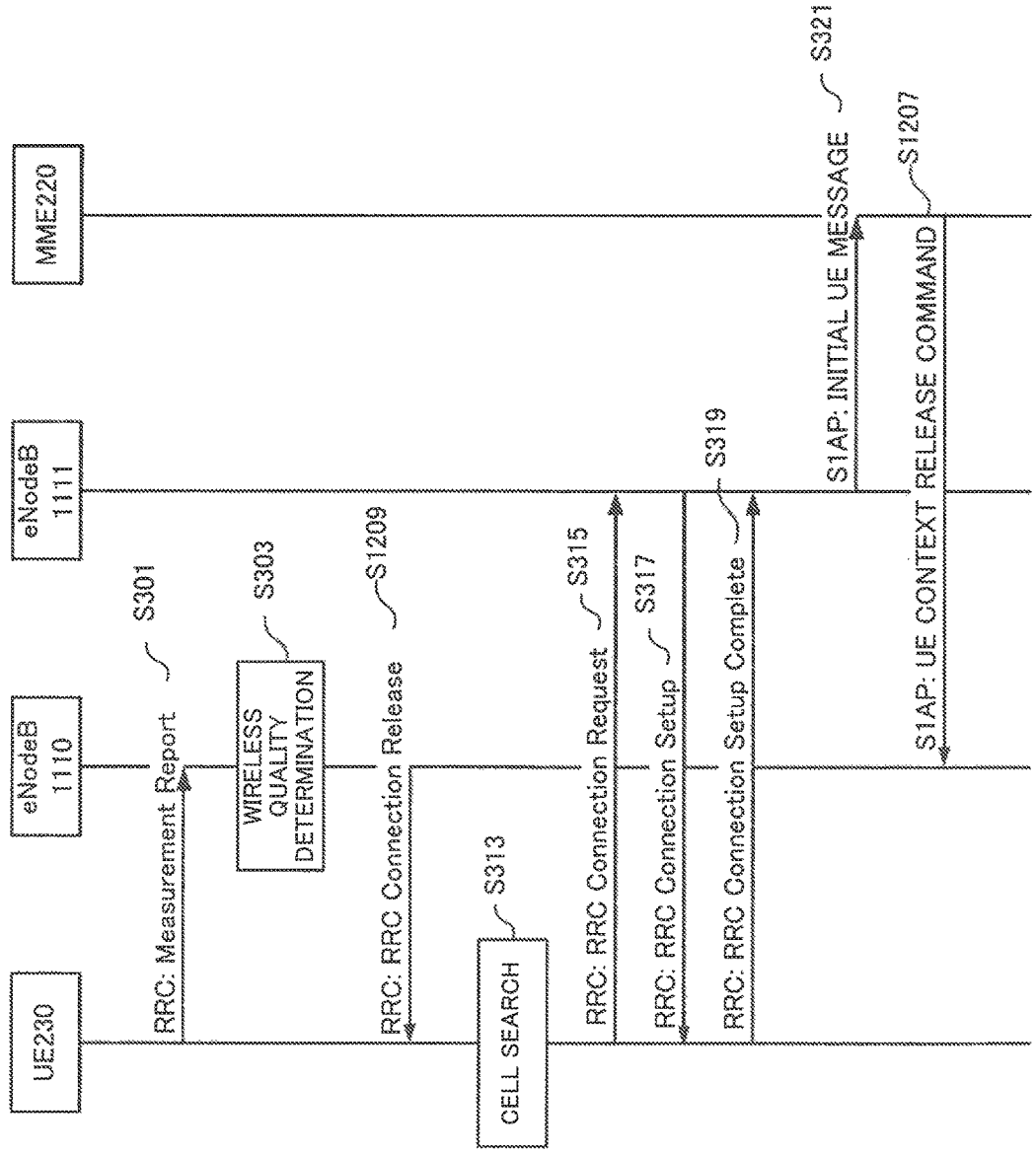
FIG. 12 is a sequence chart illustrating the operation procedure of the communications processing system including the communications processing devices according to the third exemplary embodiment of the present invention.

FIG. 12 is a sequence chart illustrating the operation procedure of the communications processing system including the communications processing devices 1110 and 1111 according to this exemplary embodiment. The same step numbers as in FIG. 3 denote the same steps in FIG. 12, and a description thereof will not be given.

If it is determined based on the determination result of the quality of wireless communications in step S303 that a handover instruction cannot be delivered, the eNodeB 1110 creates RRC Connection Release serving as an RRC protocol message and sends it to the UE 230 (step S1209). At this time, the RRC Connection Release message includes Information Element in which the carrier frequency of the wireless system is set (for example, the carrier frequency of LTE is set in redirectedCarrierInfo). The RRC Connection Release message also includes Information Element in which information for issuing a Tracking Area Update instruction is set (for example, loadBalancingTAUrequired is set in releaseCause).

Upon receiving the RRC Connection Release message, the UE 230 performs a cell search at the carrier frequency designated in redirectedCarrierInfo (step S313). With the following processing, the procedure of Tracking Area Update as in FIG. 3 is started together with the eNodeB 1110.

RRC connection is established and the eNodeB 1110 sends INITIAL UE MESSAGE serving as an S1AP protocol message to the MME 220 (step S321). The MME 220 then identifies the UE 230 in the NAS protocol layer as a UE 230 in which a call is established in the eNodeB 1110 and sends UE CONTEXT RELEASE COMMAND (step S1207). The subsequent Tracking Area Update procedure complies with the details defined as standards in, for example, 3GPP TS 23.401, and a detailed description thereof will not be given.

(Operation Timing)

Figure 13:
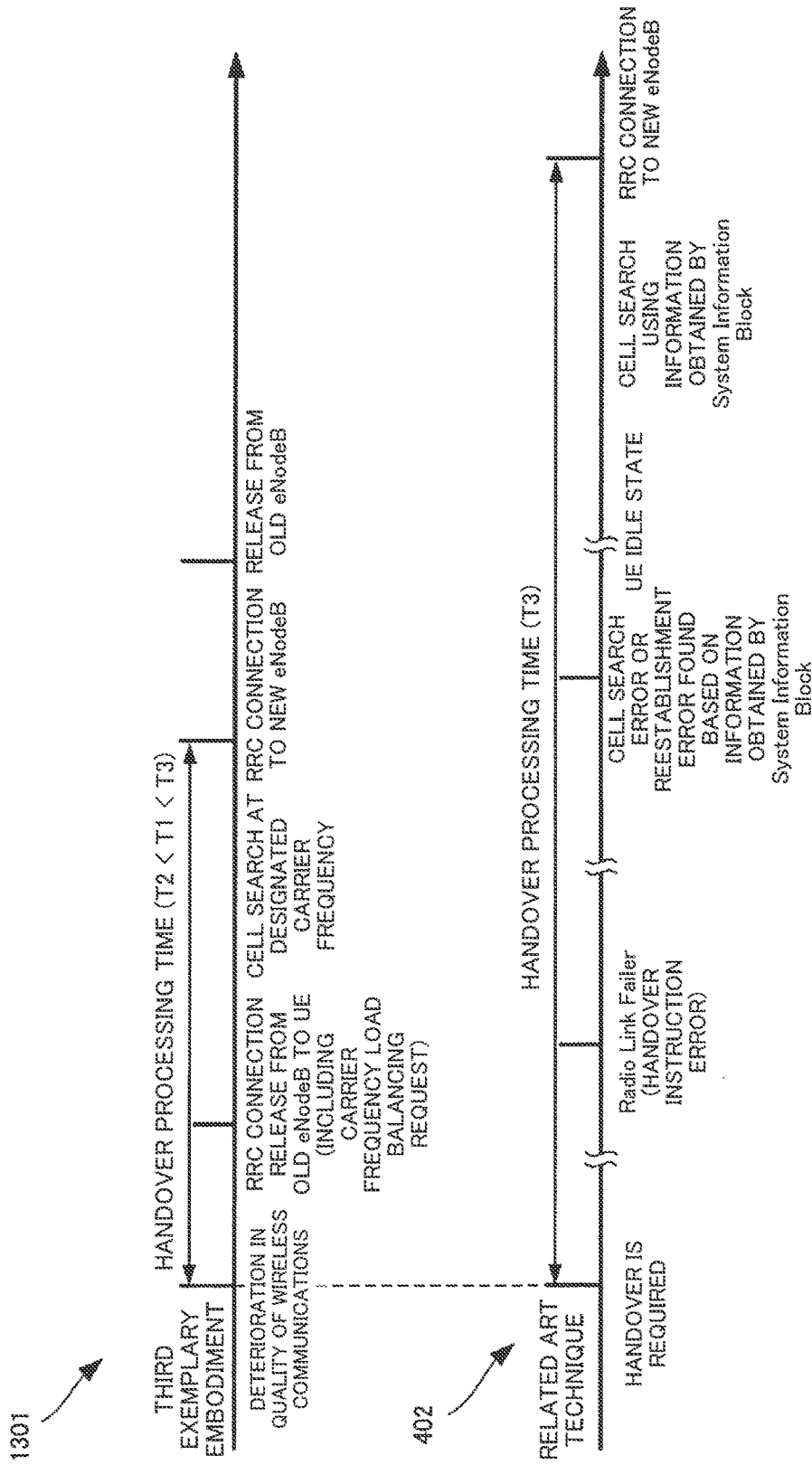
FIG. 13 is a timing chart illustrating the operation timing of the communications processing system including the communications processing devices according to the third exemplary embodiment of the present invention.

FIG. 13 is a timing chart illustrating the operation timing of the communications processing system including the communications processing devices 1110 and 1111 according to this exemplary embodiment. The same reference numerals as in FIG. 4 denote the same elements in FIG. 13, and a description thereof will not be given. Handover processing 402 according to the related art technique illustrated in the lower part of FIG. 13 is the same as in FIG. 4.

The time (T2) of handover processing 1301 according to this exemplary embodiment illustrated in the upper part of FIG. 13 is greatly shorter than the time (T3) of the handover processing 402 according to the related art technique, for the reason given with reference to FIG. 4. The time (T2) of the handover processing 1301 according to this exemplary embodiment is shorter than even the time (T1) of the handover processing 401 according to the first exemplary embodiment. This is because in the handover processing 401 according to the first exemplary embodiment, a connection release message is sent to the UE after UE release processing is performed for the MME 220. In contrast to this, in this exemplary embodiment, since a connection release message is sent to the UE without UE release processing for the MME 220, the handover is ended earlier than in the first exemplary embodiment, as is obvious from FIG. 13.

<<Functional Configuration of Communications Processing Device>>

Figure 14:
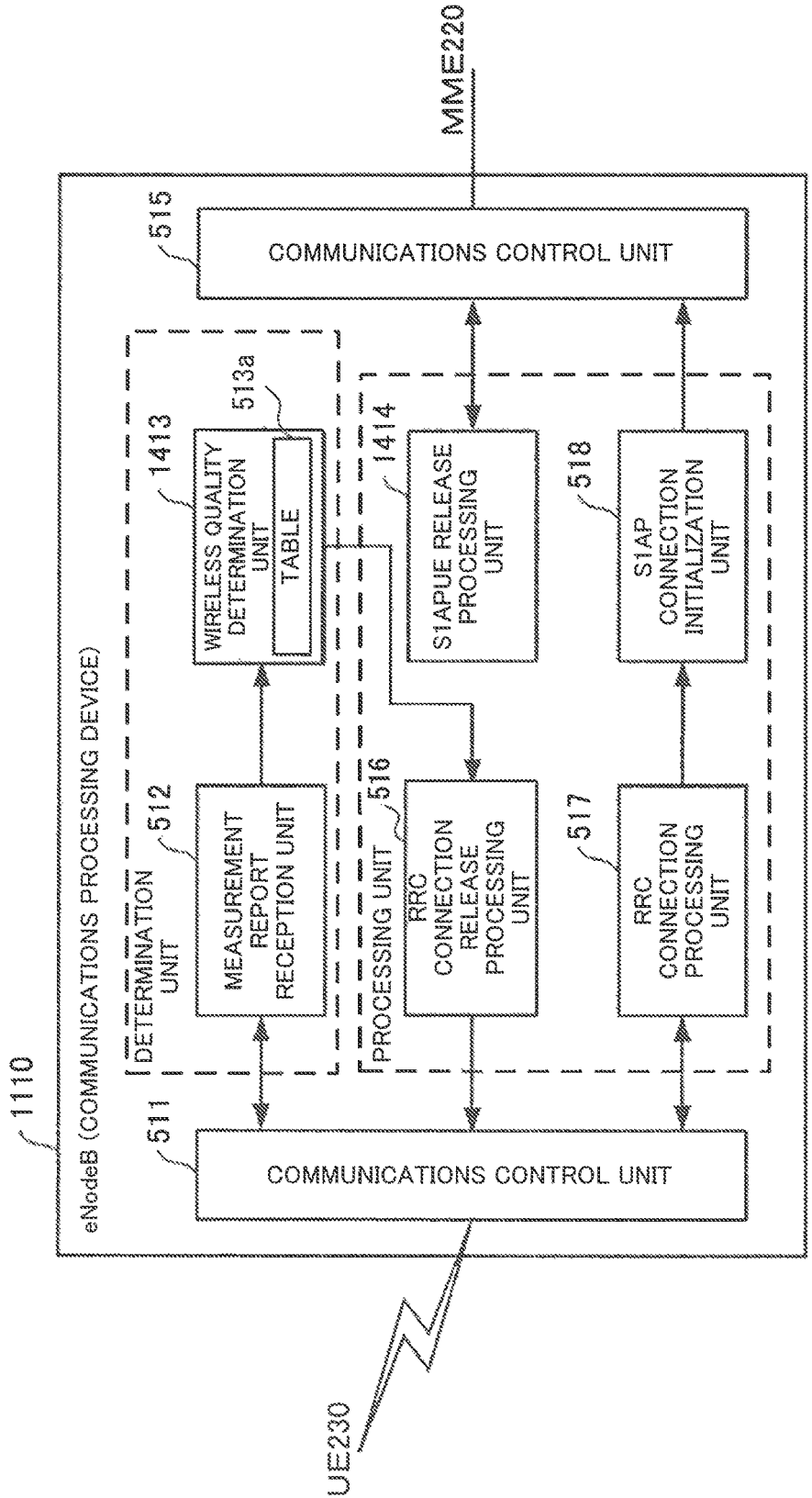
FIG. 14 is a block diagram illustrating the functional configuration of the communications processing device according to the third exemplary embodiment of the present invention.

FIG. 14 is a block diagram illustrating the functional configuration of the communications processing device 1110 according to this exemplary embodiment. Since the communications processing devices 1110 and 1111 have the same configuration, the communications processing device 1110 will be described as a representative example. The same reference numerals as in FIG. 5 denote the same functional configuration units in FIG. 14, and a description thereof will not be given. FIG. 14 illustrates the functional configuration units of the communications processing device 1110 according to this exemplary embodiment and does not illustrate the general functional configuration units needed as an eNodeB.

FIG. 14 is different from FIG. 5 in terms of, when a wireless quality determination unit 1413 determines that the quality of wireless communications has so deteriorated as to result in handover failure, notifying an RRC connection release processing unit 516 to that effect, and immediately sending an RRC Connection Release message to the UE. Another difference lies in that an S1AP•UE release processing unit 1414 performs S1AP•UE release processing together with the MME 220, regardless of the quality of wireless communications determined by the wireless quality determination unit 1413.

<<Processing Procedure of Communications Processing Device>>

Figure 15:
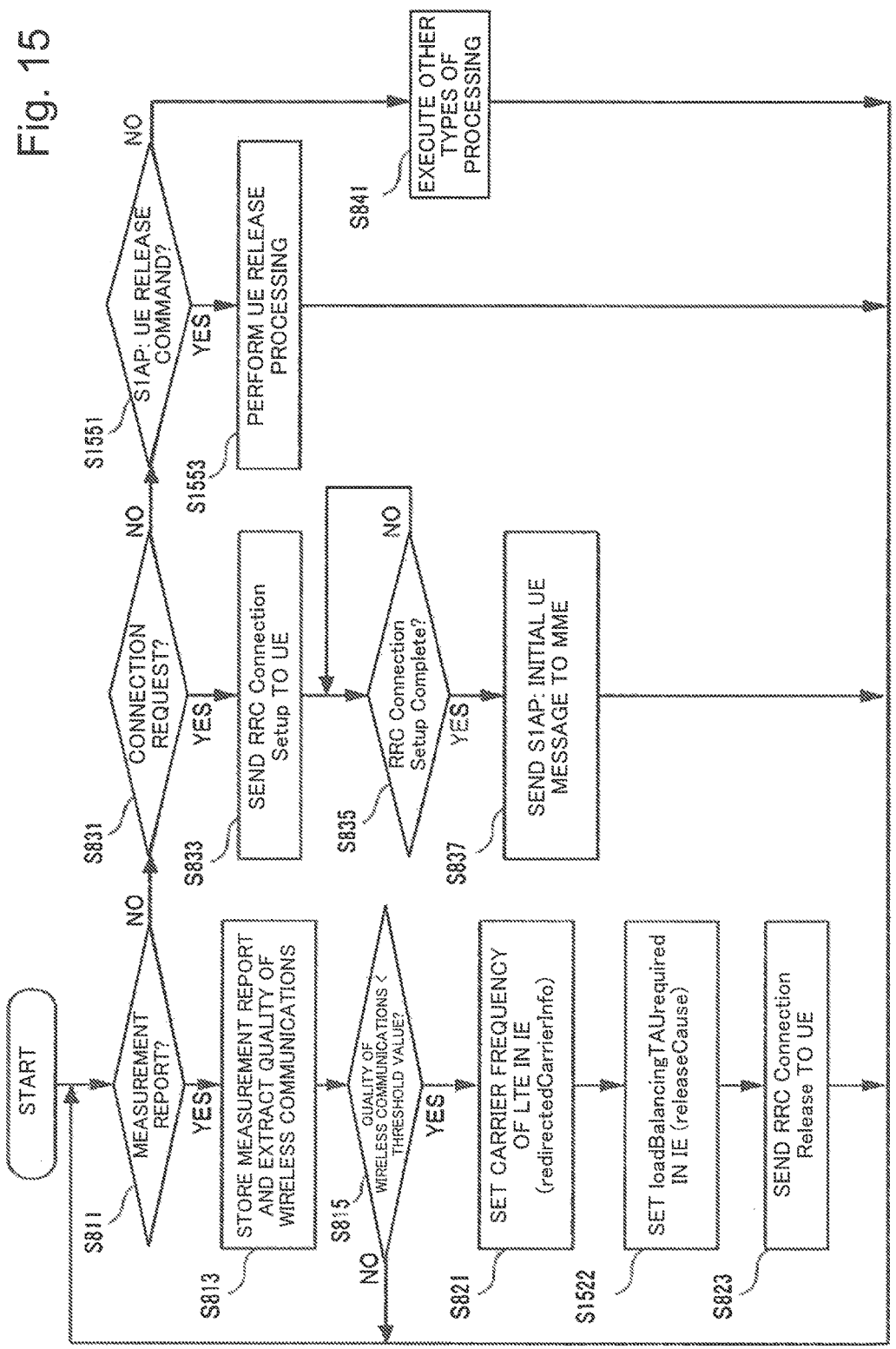
FIG. 15 is a flowchart illustrating the processing procedure of the communications processing device according to the third exemplary embodiment of the present invention.

FIG. 15 is a flowchart illustrating the processing procedure of the communications processing device 1110 according to this exemplary embodiment. This flowchart is executed using the RAM by the CPU of the communications processing device 1110 to implement the functional configuration units illustrated in FIG. 14. The same step numbers as in FIG. 8 denote the same steps in FIG. 15, and a description thereof will not be given.

If it is determined in step S815 that the quality of wireless communications is lower than the threshold value, the communications processing device 1110 sets a carrier frequency in redirectedCarrierInfo serving as an information element (IE) in step S821. In step S1522, the communications processing device 1110 also sets loadBalancingTAUrequired in releaseCause serving as an information element (IE).

In step S1551, the communications processing device 1110 determines whether an S1AP: UE release command (S1AP: UE CONTEXT RELEASE COMMAND) has been received from the MME 220. If the S1AP: UE release command has been received, the communications processing device 1110 performs UE release processing in step S1553.

According to this exemplary embodiment, in addition to the advantageous effect obtained in the first exemplary embodiment, since a connection release message is sent to the UE without UE release processing for the MME 220, the handover is ended earlier than in the first exemplary embodiment, thereby further reducing the time after call disconnection until call reconnection.

Other Embodiments

Since the present invention is applicable to any wireless system including a handover and redirection, the communications processing system is not limited to the above-mentioned embodiments.

Although the present invention has been described with reference to exemplary embodiments, the present invention is not limited to the above-mentioned exemplary embodiments. The configurations and details of the present invention can be applied with various changes which would be understood by those skilled in the art without departing from the scope of the present invention. A system or a device obtained by combining in any manner different features included in respective exemplary embodiments also falls within the scope of the present invention.

The present invention may be applied to a system equipped with a plurality of devices as well as to a single device. The present invention is also applicable when a control program which implements the functions of any exemplary embodiment is directly or remotely supplied to a system or a device. Therefore, a control program installed on a computer to implement the functions of the present invention by the computer, a medium storing the control program, and a WWW (World Wide Web) server from which the control program is downloaded also fall within the scope of the present invention. In particular, at least a non-transitory computer readable medium storing a control program for causing the computer to execute processing steps included in the above-mentioned exemplary embodiments falls within the scope of the present invention.

Other Representations of Exemplary Embodiments

Although some or all of the above-mentioned exemplary embodiments may also be described as in the following supplementary notes, the present invention is not limited to them.

(Supplementary Note 1)

A communications processing device comprising:

measurement report acquisition means for obtaining a measurement report relating to a communications environment from a mobile communications terminal located within a cell;

wireless quality determination means for determining whether or not a quality of wireless communications with the mobile communications terminal, comprised in the measurement report, is lower than a threshold value; and message transmission means for, if the quality of wireless communications is less than the threshold value, sending to the mobile communications terminal a message that has less data volume than a handover instruction message and comprises a carrier frequency for a base station to be handed over.

(Supplementary Note 2)

The communications processing device according to supplementary note 1, wherein the wireless quality determination means determines whether or not a value of one of Timing Advance type 1 and Timing Advance type 2, comprised in the measurement report, is lower than the threshold value.

(Supplementary Note 3)

The communications processing device according to supplementary note 1 or 2, wherein the message comprises an RRC Connection Release message defined in 3GPP TS 36.331.

(Supplementary Note 4)

The communications processing device according to supplementary note 3, wherein the carrier frequency is set in RedirectedCarrierInfo serving as an information element of the message.

(Supplementary Note 5)

The communications processing device according to any one of supplementary notes 1 to 4, further comprising notifying means for, if the quality of wireless communications is less than the threshold value, notifying a mobility management entity of release of the mobile communications terminal from the cell, wherein the message transmission means sends the message to the mobile communications terminal in response to an instruction issued by the mobility management entity to release the mobile communications terminal from the cell.

(Supplementary Note 6)

The communications processing device according to supplementary note 5, wherein loadBalancingTAUrequired is set in releaseCause serving as an information element of the message.

(Supplementary Note 7)

A control method for a communications processing device, the method comprising:

a measurement report acquisition step of obtaining a measurement report relating to a communications environment from a mobile communications terminal located within a cell;

a wireless quality determination step of determining whether or not a quality of wireless communications with the mobile communications terminal, comprised in the measurement report, is lower than a threshold value; and a message transmission step of, if the quality of wireless communications is less than the threshold value, sending to the mobile communications terminal a message that has less data volume than a handover instruction message and comprises a carrier frequency for a base station to be handed over.

(Supplementary Note 8)

A control program for a communications processing device, the program causing a computer to execute:

a measurement report acquisition step of obtaining a measurement report relating to a communications environment from a mobile communications terminal located within a cell;

a wireless quality determination step of determining whether or not a quality of wireless communications with the mobile communications terminal, comprised in the measurement report, is lower than a threshold value; and a message transmission step of, if the quality of wireless communications is less than the threshold value, sending to the mobile communications terminal a message that has less data volume than a handover instruction message and comprises a carrier frequency for a base station to be handed over.

(Supplementary Note 9)

A communications processing system comprising:

a mobile communications terminal located within a cell;

a communications processing device which accommodates the cell;

collection means for collecting a measurement report relating to a communications environment measured by the mobile communications terminal;

wireless quality determination means for determining whether or not a quality of wireless communications with the mobile communications terminal, comprised in the measurement report, is lower than a threshold value; and message transmission means for, if the quality of wireless communications is less than the threshold value, sending to the mobile communications terminal a message that has less data volume than a handover instruction message and comprises a carrier frequency for a base station to be handed over.

(Supplementary Note 10)

A communications processing method comprising:

a collection step of collecting a measurement report relating to a communications environment measured by a mobile communications terminal located within a cell;

a wireless quality determination step of determining whether or not a quality of wireless communications with the mobile communications terminal, comprised in the measurement report, is lower than a threshold value; and a message transmission step of, if the quality of wireless communications is less than the threshold value, sending to the mobile communications terminal a message that has less data volume than a handover instruction message and comprises a carrier frequency for a base station to be handed over.

This application claims priority based on Japanese Patent Application No. 2013-157131 filed on Jul. 29, 2013, the disclosure of which is incorporated herein by reference in its entirety.

The invention claimed is:

1. A communications processing device comprising:
a measurement report acquisition unit that obtains a measurement report relating to a communications environment from a mobile communications terminal located within a cell;
a wireless quality determination unit that determines whether or not a quality of wireless communications with the mobile communications terminal, comprised in the measurement report, is lower than a threshold value; and
a message transmission unit that changes a size of a message that comprises a carrier frequency for a base station to be handed over according to the quality of wireless communications and sends a RRC Connection Release message to the mobile communications terminal in a case when the quality of wireless communications is less than the threshold value, wherein the wireless quality determination unit determines whether or not a value of one of Timing Advance type 1 and Timing Advance type 2, comprised in the measurement report, is lower than the threshold value.

2. The communications processing device according to claim 1, wherein the carrier frequency is set in RedirectedCarrierInfo serving as an information element of the message.

3. The communications processing device according to claim 1, further comprising a notifying unit that notifies a mobility management entity of release of the mobile communications terminal from the cell,
wherein the message transmission unit sends the message to the mobile communications terminal in response to an instruction issued by the mobility management entity to release the mobile communications terminal from the cell.

4. The communications processing device according to claim 1, wherein in a case when the quality of wireless communications is less than the threshold value, loadBalancingTAUrequired is set in releaseCause serving as an information element of the message without release processing of the mobile communications terminal from the cell for the mobility management entity.

5. The communications processing device according to claim 2, further comprising a notifying unit that notifies a mobility management entity of release of the mobile communications terminal from the cell,
wherein the message transmission unit sends the message to the mobile communications terminal in response to an instruction issued by the mobility management entity to release the mobile communications terminal from the cell.

6. A non-transitory computer readable medium storing a control program for a communications processing device, the program causing a computer to function as:
a measurement report acquisition unit that obtains a measurement report relating to a communications environment from a mobile communications terminal located within a cell;
a wireless quality determination unit that determines whether or not a quality of wireless communications with the mobile communications terminal, comprised in the measurement report, is lower than a threshold value; and
a message transmission unit that changes a size of a message that comprises a carrier frequency for a base station to be handed over according to the quality of wireless communications in a case when the quality of wireless communications is less than the threshold value and sends a RRC Connection Release message to the mobile communications terminal, wherein the wireless quality determination unit determines whether or not a value of one of Timing Advance type 1 and Timing Advance type 2, comprised in the measurement report, is lower than the threshold value.

7. A communications processing system comprising:
a mobile communications terminal located within a cell;
a communications processing device which accommodates the cell;
a collection unit that collects a measurement report relating to a communications environment measured by the mobile communications terminal;
a wireless quality determination unit that determines whether or not a quality of wireless communications with the mobile communications terminal, comprised in the measurement report, is lower than a threshold value; and
a message transmission unit that changes a size of a message that comprises a carrier frequency for a base station to be handed over according to the quality of wireless communications in a case when the quality of wireless communications is less than the threshold value and sends a RRC Connection Release message to the mobile communications terminal, wherein the wireless quality determination unit determines whether or not a value of one of Timing Advance type 1 and Timing Advance type 2, comprised in the measurement report, is lower than the threshold value.

* * * * *